United States Patent
Katagiri et al.

(10) Patent No.: US 6,377,421 B1
(45) Date of Patent: Apr. 23, 2002

(54) DISK ROTATING DRIVE MECHANISM

(75) Inventors: Masayuki Katagiri; Sigeru Kasai; Makoto Fujishima; Hisashi Fukuzawa, all of Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 09/514,397

(22) Filed: Feb. 28, 2000

(30) Foreign Application Priority Data

May 28, 1999 (JP) .......................................... 11-148998

(51) Int. Cl.[7] .......................................... G11B 17/028
(52) U.S. Cl. ..................................................... 360/99.04
(58) Field of Search ........................... 360/99.04, 99.05, 360/99.08, 99.12; 369/270, 271

(56) References Cited

U.S. PATENT DOCUMENTS

| | | | | |
|---|---|---|---|---|
| 5,103,358 A | * | 4/1992 | Munekata | 360/99.04 |
| 5,311,383 A | | 5/1994 | Yokouchi | 360/99.08 |
| 5,648,881 A | * | 7/1997 | Yokouchi | 360/99.04 |
| 5,701,217 A | * | 12/1997 | Yokouchi | 360/99.05 |
| 5,715,115 A | * | 2/1998 | Takarasawa et al. | 360/99.05 |

* cited by examiner

*Primary Examiner*—A. J. Heinz
*Assistant Examiner*—Angel Castro
(74) *Attorney, Agent, or Firm*—Hogan & Hartson, LLP (57) ABSTRACT

A floppy disk rotating drive mechanism having a metal drive pin configured to withstand high speeds and to prevent damage to a disk by the pin when the disk is chucked. The drive mechanism has a rotation center shaft to engage the center hole in the floppy disk, a rotating unit that rotates with the rotation center shaft, a chucking lever pivotally supported on one end by the rotating unit and provided with the drive pin on the other end. The disk is rotated when the drive pin engages the drive pin engaging hole in the disk positioned eccentrically from the center hole. The drive pin is made of stainless steel and has an inclined upper surface that is higher on an outside portion farther away from the rotating shaft than on an inside portion nearer the rotating shaft. The outer portion of upper surface of the drive pin is also provided with a chamfered section. A front portion of the drive pin in the leading direction of the rotation has curved surface and a back portion of the drive pin has a flat surface.

12 Claims, 6 Drawing Sheets

DIRECTION
OF ROTATION

DISK ROTATING DRIVE MECHANISM

BACKGROUND OF THE INVENTION

1. Field of the Invention

This invention relates to a disk-rotating drive mechanism for a floppy disk, and in particular, to a metal drive pin used in such disk-rotating drive mechanism.

2. Description of the Related Art

Disk-rotating drive mechanisms, such as rotation drive mechanisms for 3.5-inch floppy disks, have a shaft engaging the center hole of the disk, a rotating unit that rotates the shaft, a chucking lever and a drive pin attached to one end of the chucking lever. The second end of the chucking lever is supported by the rotating unit. The drive pin engages the drive pin engaging hole positioned eccentrically from the center hole of the disk and drives the rotation of the disk.

The disk-rotating drive mechanism disclosed in Japanese Laid-Open Patent Application No. 5-41011 is one example. In this example, the drive pin and chucking lever are integrated using resin molding. When a disk hub mounting section mounts the disk, the disk is tilted and rides up over the drive pin until the resin-molded drive pin engages the drive pin engaging hole in the disk. In this example, the upper surface of the drive pin is tilted so that the drive pin is relatively flat when the drive pin is not engaging the drive pin engaging hole in the disk and friction with the drive pin is reduced.

In the disk-rotating drive mechanism disclosed in Japanese Laid-Open Patent Application No. 4-38751, the drive pin and the chucking lever are made of different materials. In this example, one end of the chucking lever pivots on the rotating unit, which rotates with the rotating axis. The chucking lever is allowed to rotate parallel to the rotating unit with the drive pin situated on the other end of the chucking lever. The chucking lever is also equipped with a plate spring so that the drive pin moves axially and falls into place when the drive pin is to engage the drive pin engaging hole in the disk. This displacement of the drive pin is restricted to a given range.

In recent years, disk-rotating drive mechanisms have become thinner and faster. As disk-rotating drive mechanisms have become thinner, the space between the rotation drive shaft and the disk hub mounting section above the hub platform on the outside edge of the drive shaft has become smaller. The space between the disk hub mounting section and the upper surface of the drive pin has also become smaller.

When the disk-rotating drive mechanism mounts the disk on the hub platform, the drive shaft engages a square center hole in the center of the disk hub, and the drive pin engages a rectangular drive pin engaging hole positioned eccentrically from the center hole in the disk. Then, the disk is centered and can be rotated by the rotation drive mechanism. However, the drive mechanism begins to operate when the disk has been placed on the hub platform. When the drive shaft engages the center hole in the disk hub, the disk hub is generally positioned over the drive pin and the drive pin engages the drive pin engaging hole in the disk hub when the drive pin is rotated along with the rotating unit and the chucking lever.

Therefore, when the space between the disk hub mounting section and the upper surface of the drive pin is narrowed, and the disk is positioned on the disk hub and the drive pin extends into the drive pin engaging hole on the disk hub to center the disk, the drive pin and the drive pin engaging hole are often incompletely engaged. The drive pin moves out of the drive pin engaging hole when the disk is chucked on the hub platform.

As the speed of disk-rotating drive mechanisms increases, the insertion of the drive pin into the drive pin engaging hole in the disk hub when the disk hub is chucked on the hub platform can cause it to be struck hard by the drive pin. Therefore, resin-molded drive pins cannot withstand the impact. The drive pin is eventually damaged or worn, which reduces the precision of the disk centering process. As a result, the mechanism may become less reliable. A mechanism was disclosed in Japanese Laid-Open Patent Application No. 4-38751 in which the drive pin and the chucking lever are made of different materials. When the drive pin is made of metal, the problem of drive pin damage and wear is solved. However, when a disk is centered and the disk hub is positioned over a metal drive pin, the disk hub can come into contact with the drive pin, causing damage to the disk hub.

A mechanism is disclosed in Japanese Laid-Open Patent Application No. 5-41011 in which the surface of the metal drive pin is inclined. As a result, the disk hub is parallel to the upper surface of the drive pin before the drive pin engages the drive pin engaging hole in the disk. Therefore, the disk hub is less likely to be damaged if the upper surface of the drive pin comes into contact with the disk hub. In this mechanism, the drive pin, peripheral chucking lever, rotating unit and disk mounting section are all manufactured with greater dimensional precision, which makes it even less likely that the upper surface of the drive pin will come into contact with the disk hub. However, the edge of the drive pin can still come into contact with the disk hub in this mechanism. This problem remains unsolved in this reference.

Commonly assigned U.S. Pat. Nos. 5,311,383('383) and 5,648,881 ('881) describe a chucking mechanism with a plastic drive pin that has at least one planar surface engaging a drive hole of the disk hub when chucking is completed. This drive pin planar surface extends in a plane that is at a non-zero angle to a plane containing a portion of a surface of a rotary member that contacts the disk hub. More particularly, the patents '383 and '881 teach that this non-zero angle is 2°±1.5°.

SUMMARY OF THE INVENTION

Accordingly, the present invention is directed to a disk-rotating drive mechanism that substantially obviates the above-discussed limitations and disadvantages of the related art.

An object of the present invention is to provide a disk-rotating drive mechanism in which the drive pin is made of metal and configured to withstand high speeds and to prevent damage to the disk when the disk is chucked.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a disk rotating drive mechanism for rotating a floppy disk having a disk hub with a center hole and a drive pin engaging hole positioned eccentrically from the center hole, the disk rotating drive mechanism comprising a rotating shaft for engaging the center hole in the disk hub, a rotating unit that rotates with the rotating shaft, a chucking lever pivotally supported by the rotating unit at one end, and a drive pin made of metal and provided on another end of the chucking lever for engaging the drive pin engaging hole in the disk hub to rotate the disk. The drive pin defines an upper surface that is inclined to be higher at an outside portion farther from the rotation shaft than at an inside portion nearer the rotating shaft. The drive pin further defines a chamfered section formed at the outside edge of the inclined upper surface. Further, the drive pin defines a front surface corresponding to a portion of the drive pin that is leading in a rotation direction of the rotating unit, and a back surface corresponding to a portion of the drive pin that is trailing in the rotation direction of the rotating unit, wherein the front surface is curved and the back surface is flat.

It is to be understood that both the foregoing general description and the following detailed description are exemplary and explanatory and are intended to provide further explanation of the invention as claimed.

BRIEF DESCRIPTION OF THE DRAWINGS

FIGS. 8(a)–(c) show the chucking lever and the drive pin of one embodiment of the present invention.

DETAILED DESCRIPTION OF THE PREFERRED EMBODIMENTS

Figure 9:
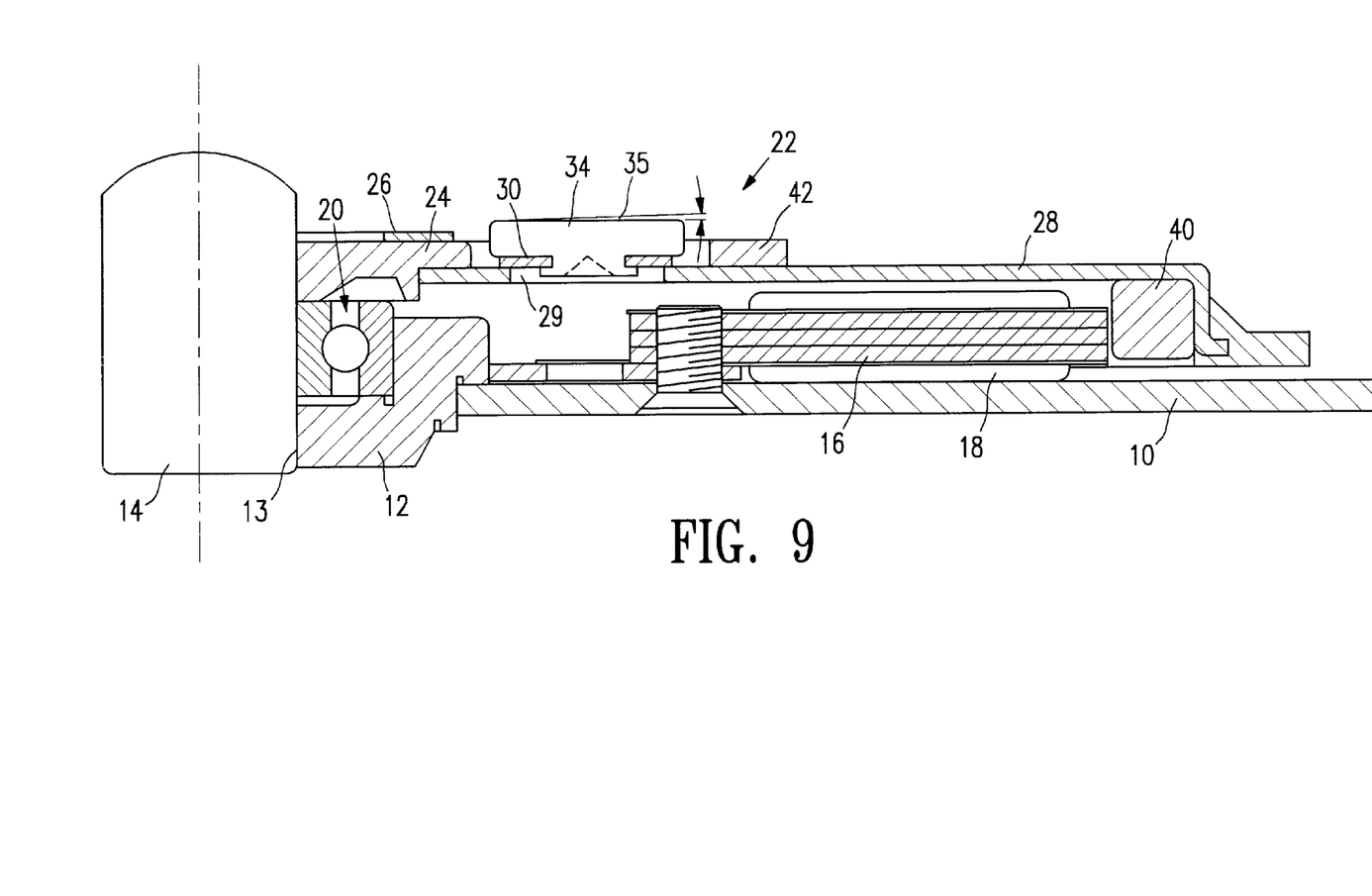
FIG. 9 is a partial frontal cross-sectional view of a disk-rotating drive motor with the disk-rotating drive mechanism according to an embodiment of the present invention.

An embodiment of the disk-rotating drive mechanism of the present invention is described in detail with reference to the drawings. The overall configuration of the disk-rotating drive mechanism is described with reference to FIG. 9. In FIG. 9, a bearing holder 12 is inserted into the center hole of a substrate 10 and secured to the substrate 10 by an appropriate means such as caulking. A layered stator core 16 is positioned on the outer edge of the portion of the bearing holder 12 extending from the upper surface of the substrate 10, and is secured to the substrate 10 by a screw. The stator core 16 has a plurality of poles that extend radially toward the outer edge. Drive coils 18 are wound around these poles.

The bearing holder 12 is dish-shaped with a hole 13 at the center of the bottom of the dish. A ball bearing 20 is inserted in the space on the inside of the dish. The outer ring on the ball bearing 20 is inserted into the bearing holder 12 under pressure. The diameter of the inner ring on the ball bearing 20 is somewhat smaller than the diameter of the inside surface of the hole 13 in the bearing holder 12. The rotating shaft 14 is inserted under pressure into the inside of the inner ring of the ball bearing 20, and the bottom end of the rotating shaft 14 is inserted into the hole 13 in the bearing holder 12. The bearing holder 12 can be made of a sintered metal containing a lubricating oil. The lubricating oil flows from the surface of the hole 13 so that the bearing holder 12 lubricates the rotating shaft 14. Therefore, the rotating shaft 14 is pivotally supported by the ball bearing 20 and the bearing holder 12 in a radial direction.

The upper half of the rotating shaft 14 extends upwards from the ball bearing 20 and the extended portion of the rotating shaft 14 is attached to a rotating unit 22 with a hub platform 24, a disk hub mounting section 26, a chucking lever 30, a drive pin 34, a rotor case 28, a chucking magnet 42 and a rotor magnet 40. The rotating unit 22 rotates with the rotating shaft 14. The hub platform 24 is inserted under pressure into the top of the rotating shaft 14, and a rubber ring is attached to the upper surface of the hub platform 24 to form the disk hub mounting section 26. The upper end of the rotating shaft 14 extends upwards from the hub platform 24 and the disk hub mounting section 26. The bottom end of the hub platform 24 is attached to the rotor case 28. The rotor case 28 forms a flat cap to cover the stator of the motor comprising a stator core 16 and a drive coil 18.

A ring-shaped rotor magnet 40 is attached to the inner wall of the rotor case 28. The rotor magnet 40 has a plurality of magnetized poles with the N and S poles opposing each other. A space of a specific size is formed between the inner wall of the rotor magnet 40 and the ends of the poles on the stator core 16. By controlling the magnetization of the drive coil 18 based on the rotational position of the rotor magnet 40, magnetic attractive force is generated between the rotor magnet 40 and the extended poles to rotate the rotating unit 22.

Figure 1:
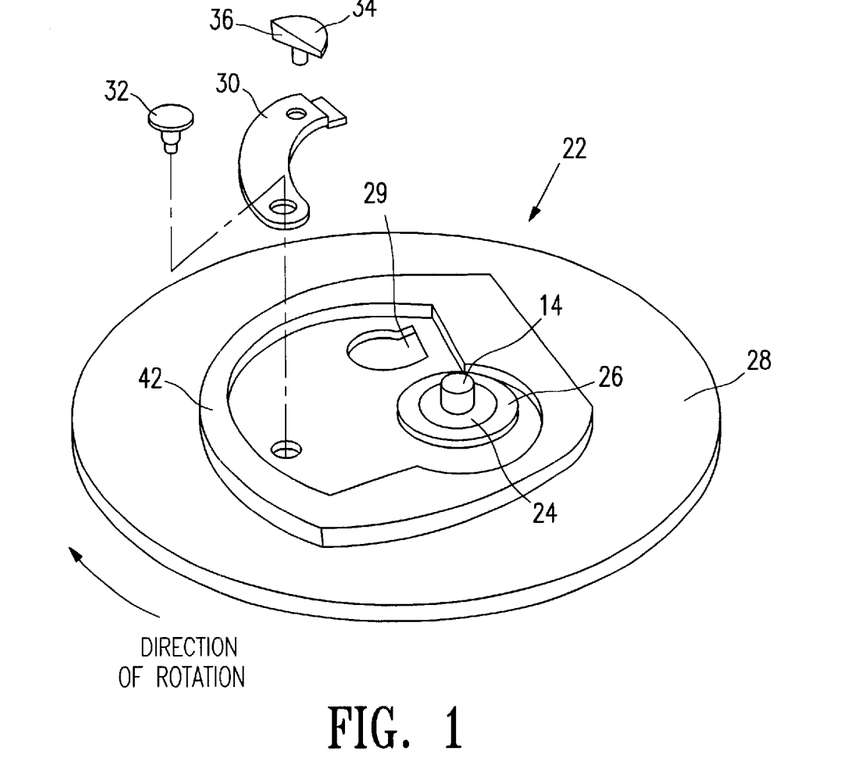
FIG. 1 is an exploded perspective view of one embodiment of a disk-rotating drive mechanism of the present invention.
Figure 4A:
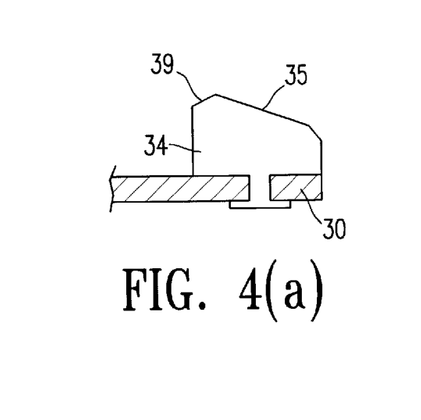
FIG. 4(a) is a cross-sectional view of the drive pin of FIGS. 1 and 2.
Figure 4B:
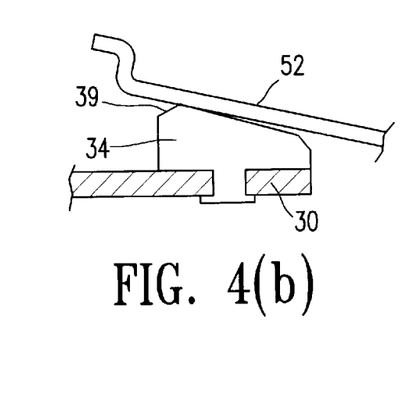
FIG. 4(b) is a cross-sectional view showing the disk hub positioned over the drive pin of the present invention.
Figure 5A:
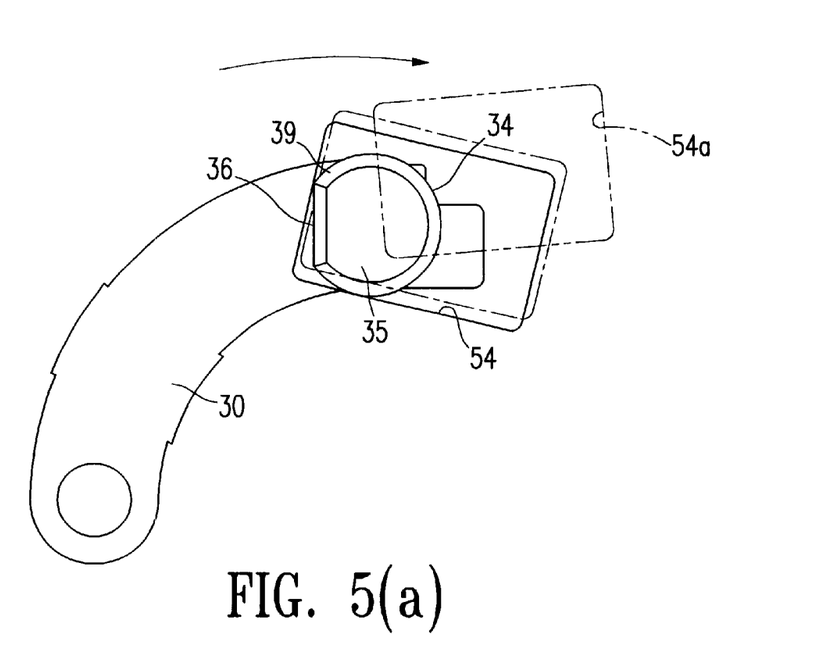
FIG. 5(a) is a planar views of a drive pin engaging a disk hub according to the present invention.
Figure 5B:
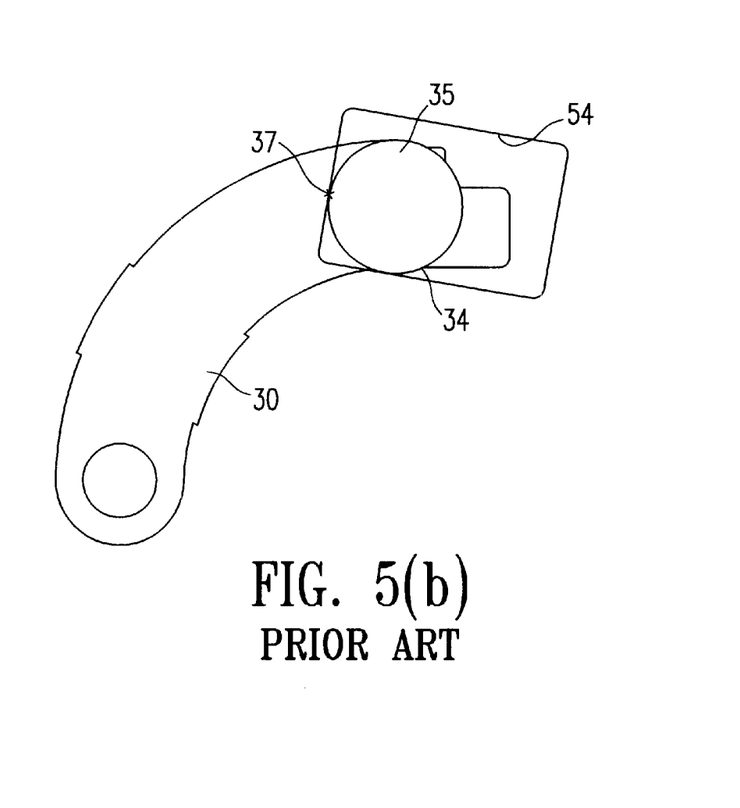
FIG. 5(b) is a planar views of a drive pin engaging a disk hub according to prior art.
Figure 6:
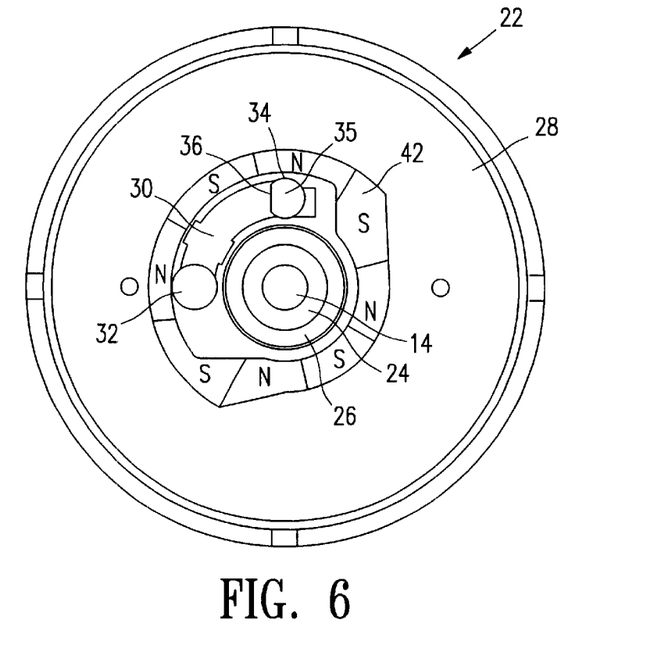
FIG. 6 is a planar view of the rotating unit of one embodiment of the present invention.
Figure 7:
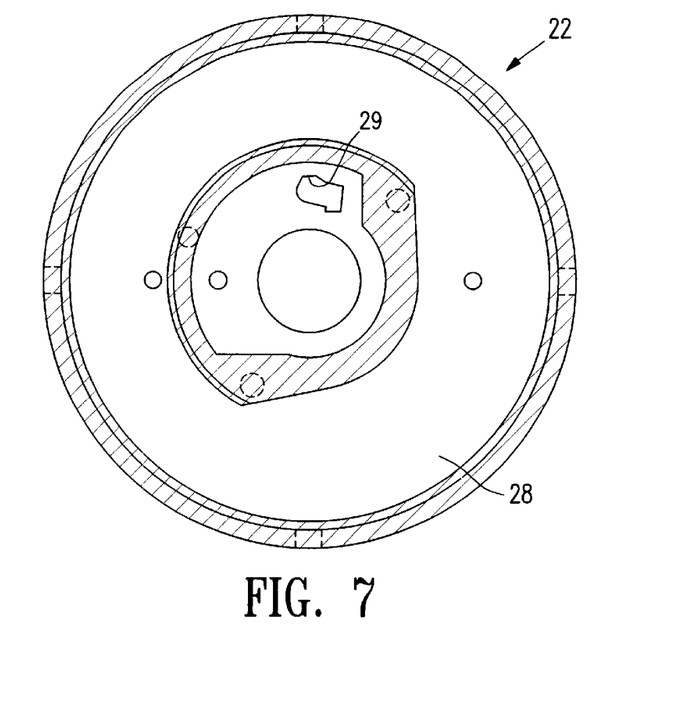
FIG. 7 is a planar view of the rotor case of the rotating unit of one embodiment of the present invention.
Figure 8A:
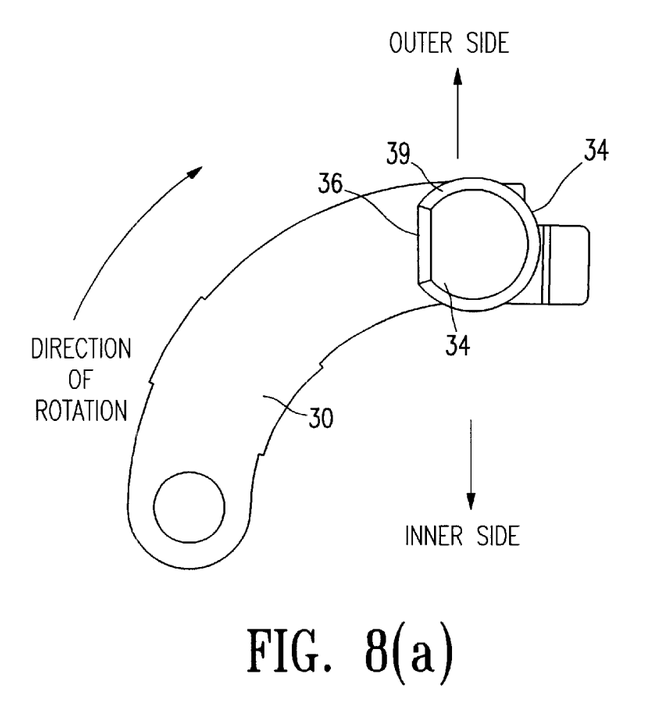
FIG. 8(a) is a planar view.
Figure 8B:
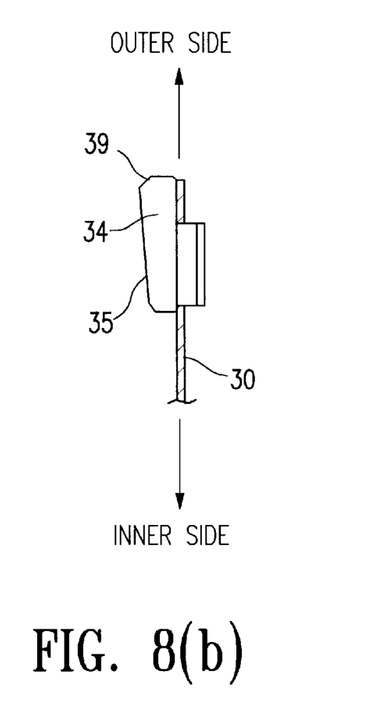
FIG. 8(b) is a partial cross-sectional view along a tangential direction.
Figure 8C:
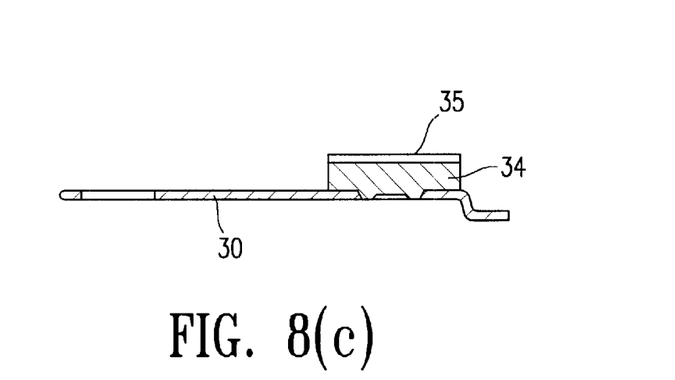
FIG. 8(c) is a cross-sectional view from along a radial direction.

The components surrounding the drive pin 34 in the rotating unit 22 are described with reference to FIG. 1 through FIG. 8. As shown in FIG. 1, FIG. 6 and FIG. 7, one end of an arc-shaped chucking lever 30 is supported so as to allow the pin-shaped shaft 32 to rotate in a position eccentric from the rotating shaft 14 in the rotor case 28 comprising part of the rotating unit 22. The chucking lever 30 allows the shaft 32 to rotate horizontally as guided by the upper surface of the rotor case 28. The other end of the chucking lever 30 is bent downwards. The bent portion allows the chucking lever 30 to rotate horizontally within a given range from a window hole 29 in the rotor case 28. As shown in FIG. 8, the drive pin 34 is attached above the other end of the chucking lever 30. Any appropriate means can be used to secure the drive pin 34 to the chucking lever 30. As shown in FIG. 8 (c), the bottom of the drive pin 34 is inserted into a hole in the chucking lever 30, and the bottom is secured using caulking. The window hole 29 in the rotor case 28 remains free of the caulking for the drive pin 34.

Figure 2:
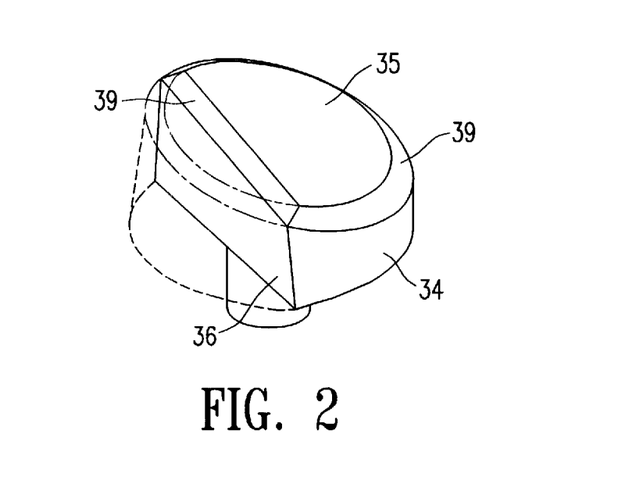
FIG. 2 is a perspective view of the drive pin of an embodiment of the present invention.

The drive pin 34 can be made of a metal such as stainless steel. In this embodiment of the present invention, ferrite stainless steel is sintered so as to be able to generate a magnetic attractive force between the magnets. The drive pin 34 is column-shaped and configured as shown in FIG. 2 in the following way. As shown in FIG. 9, the upper surface of the pin 34 has an inclined surface 35 that is higher on the outside than on the inside when centered on the rotating shaft 14. Unless otherwise indicated, "outside" refers to a direction from the center toward a periphery of the disk or disk drive, or a portion farthest away from the rotating shaft, and "inside" refers to a direction from the periphery toward the center, or a portion nearest the rotating shaft. The outside edge of the inclined surface 35 also has a chamfered section 39. The angle of the chamfered section 39 is 3° to 15° with respect to the inclined surface 35. If the angle of the chamfered section 39 is less than 3°, the angle between the inclined surface 35 and the flat surface 36 described below will be too sharp. As a result, the uppermost edge could damage the bottom of the disk hub. If the angle of the chamfered section 39 is greater than 15°, the angle between the chamfered section 39 and the inclined surface 35 will be too sharp, and the bottom of the disk hub could be damaged.

The rotating unit 22 in FIG. 1 rotates in a clockwise direction. The front portion of the drive pin 34 is curved, while the back portion of the drive pin 34 is a flat surface 36. Unless otherwise indicated, the "front" portion of the drive pin 34 refers to the leading portion in the direction of rotation of the rotating unit 22, and the "back" portion refers to the trailing portion. The chamfered section 39 is formed on the upper end of this flat surface 36. The above-discussed curved surface occupies more than a half of the entire peripheral surface of the pin 34, or up to $\frac{2}{3}$ or $\frac{4}{5}$ of the entire peripheral surface.

Figure 3:
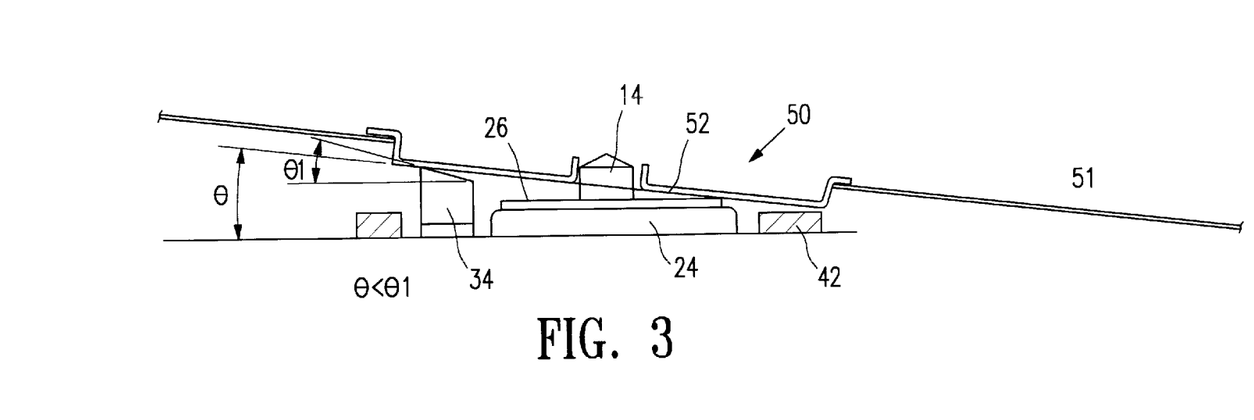
FIG. 3 is a partial lateral cross-sectional view of the disk hub of the embodiment of FIG. 1.

As shown in FIG. 6, the chucking magnet 42 is attached to the upper surface of the rotor case 28 encircling the hub platform 24 and the chucking lever 30. The disk hub mounting section 26 attached to the hub platform 24 is positioned at the inside of the drive pin 34 and the upper surface on the disk hub mounting section 26 is higher than the upper surface on the chucking magnet 42. As shown in FIG. 3, when the disk hub 52 is centered on the disk by the disk hub mounting section 26, the disk hub 52 remains above the drive pin 34 until the drive pin 34 engages the drive pin engaging hole in the disk hub 52. When the angle of inclination for the disk hub 52 is θ, the angle of inclination θ1 of the top surface of the drive pin 34 is greater than or nearly equal to θ.

The operation and effect of this embodiment of the present invention is now described. When a floppy disk 50 is placed in the disk-rotating drive mechanism, the rotating shaft 14 is inserted into the center hole of the disk hub 52, the chucking lever 30 and the drive pin 34 are rotated along with the rest of the rotating unit, and the drive pin 34 engages the drive pin engaging hole 54 (FIG. 5) positioned eccentrically from the center hole in the disk hub 52. The chucking lever 30 and the drive pin 34 continue to rotate along with the rotating unit 22 and the rotating shaft 14, the drive pin 34 engages the inside corner of the drive pin engaging hole 54 in the disk hub 52, and the disk is rotated. The drive pin 34 applies force radially to the outside of the disk hub 52.

When a floppy disk 50 is loaded, the position of the drive pin engaging hole 54 and the position of the drive pin 34 match. However, sometimes the drive pin 34 rotates with the rotating unit 22 but the position of the drive pin engaging hole 54 in the disk hub 52 is off. In these situations, the position of the drive pin engaging hole 54 does not match the position of the drive pin 34. When the floppy disk 50 is loaded, the rotating shaft 14 is inserted into the center hole in the disk hub 52 as shown in FIG. 3. One end of the disk hub 52 is placed on the disk hub mounting section 26, and another end of the disk hub 52 is placed on the drive pin 34. Here, a line connecting the contact point between the disk hub 52 and the disk hub mounting section 26 and the contact point between the disk hub 52 and the drive pin 34 is inclined at an angle θ. Because the drive pin 34 rotates with the rotating unit 22, the drive pin 34 scrapes the bottom surface of the disk hub 52 as it rotates. Eventually, the drive pin 34 reaches the position of the drive pin engaging hole 54 in the disk hub 52 and enters the drive pin engaging hole 54. The magnetic attractive force from the chucking magnet 42 brings the disk hub 52 into contact with the disk hub mounting section 26, and it is chucked in the proper location. The chucking force is maintained by the attraction of the magnetized disk hub 52 to the chucking magnet 42, and the drive pin 34 rotates the disk 50 with this force as mentioned above. In FIG. 3, reference numeral 51 denotes a recording medium made of magnetic film.

As mentioned above, the disk hub 52 is inclined at an angle θ before the drive pin 34 engages the drive pin engaging hole 54 in the disk hub 52. Consequently, the upper surface of the drive pin 34 defines the inclined surface 35 corresponding to the angle of which is higher on the outside than the inside. The angle θ1 of the inclined surface 35 is slightly greater than or equal to θ. The reason for this relationship between θ and θ1 is that it allows the disk hub 52 and the drive pin 34 to make a face-to-face contact or a contact that is close to a face-to-face contact when the drive pin 34 is not engaged with the drive pin engaging hole 54 in the disk hub 52.

When the drive pin 34 is inserted into the drive pin engaging hole 54 in the metal disk hub 52 and the drive pin 34 strikes the side of the drive pin engaging hole 54 as the disk-rotating drive mechanism is at high speed, the impact on the drive pin 34 can be considerable. Therefore, the drive pin 34 in the embodiment shown in the drawings is made of metal, such as stainless steel. This prevents the drive pin 34 from being damaged or worn down when it is inserted into the drive pin engaging hole 54 on the disk hub 52.

When the drive pin 34 is made of a metal such as stainless steel, however, it can cause damage to the disk hub 52 if the drive pin 34 rubs against the bottom surface of the disk hub 52 as it is rotated. In this respect, because the angle θ1 is equal to or greater than the angle θ in the embodiment shown in the drawings, they make a face-to-face contact or a contact that is close to a face-to-face contact when the drive pin 34 is not engaged with the drive pin engaging hole 54 in the disk hub 52. As a result, the amount of abrasion damage on the disk hub 52 caused by the drive pin 34 can be reduced.

Figure 4C:
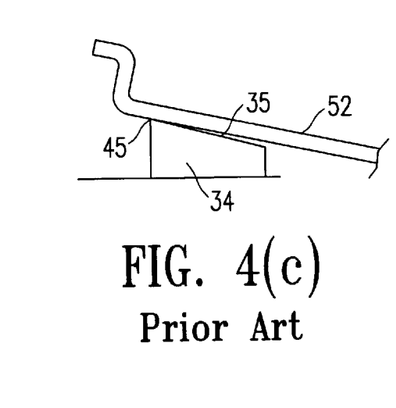
FIG. 4(c) is a cross-sectional view showing a disk hub positioned over a drive pin according to prior art.

Although making the upper surface of the drive pin 34 an inclined surface 35 has the advantage mentioned above, a sharp edge 45 is formed on the outer edge of the upper surface of the drive pin 34 as viewed from the rotating shaft 14 as shown in FIG. 4 (c), if the upper surface of the drive pin 34 is a simple inclined surface 35 in which the outside is higher than the inside. Because the sharp edge 45 is formed on the higher part of the drive pin 34, the disk hub 52 can be damaged if the sharp edge 45 comes into contact with the disk hub 52 and rubs against it. It is very difficult to make the angle of inclination for the disk hub 52 uniform because of the small space between the rotating drive 14 and the disk hub mounting section 26, the small space between the disk hub mounting section 26 and the upper surface of the drive pin 34, and dimensional errors in the drive pin 34, the peripheral chucking lever 30, the rotating unit 22 and the disk hub mounting section 26. Therefore, it is difficult to make a face-to-face contact between the drive pin 34 and the disk hub 52.

As shown in FIG. 2 and FIG. 4 (a), according to the present invention, a chamfered section 39 is formed in the outer edge of the inclined surface 35 of the drive pin 34. This chamfered section reduces the possibility of damage to the disk hub 52 by a sharp edge on the outside edge of the inclined surface 35, even when the surface rubs against the disk hub. In order to avoid abrasion damage to the disk hub 52, the angle of the chamfered section 39 should be greater than 3° and less than 15°, and preferably greater than 5° and less than 10°, while the rest of the inclined surface 35 is flat. The same effect can be obtained if the chamfered section 39 is cone-shaped, even when it forms an angle with respect to the inclined surface 35. Abrasion damage to the disk hub 52 can also be prevented effectively if the chamfered section 39 is arc-shaped in cross-section and integrates smoothly with the inclined surface 35 so as not to form an angle.

In another embodiment shown in the drawings, the front portion of the drive pin 34 in the rotational direction of the rotating unit 22 is rounded and has a cylindrical shape, and the back half of the drive pin 34 is a flat surface 36 cut into the cylinder. Thus, the drive pin 34 is D-shaped when viewed from above.

If the drive pin 34 is entirely a round cylinder without the flat surface 36 on the side, it would take longer for the drive pin 34 to move along the disk hub 52, to find the drive pin engaging hole 54 in the disk hub 52, and to engage the drive pin engaging hole 54. This round configuration is shown in FIG. 5 (b). As the drive pin 34 searches for the drive pin engaging hole 54, it catches the edge of the drive pin engaging hole 54. As shown in FIG. 5 (b), as the drive pin 34 approaches the drive pin engaging hole 54, the upper edge section of the drive pin 34 comes in sliding contact with the edge of the drive pin engaging hole 54 and moves with respect to the edge. Finally, as soon as the back end 37 of the drive pin 34 leaves the edge of the drive pin engaging hole 54, the drive pin 34 is inserted into the drive pin engaging hole 54, and the disk hub 52 is mounted on the disk hub mounting section 26. When there is no chamfered section on the upper surface of the drive pin 34, the end edge of the drive pin engaging hole 54 can catch the edge of the back end 37 of the drive pin 34. Also, when the drive pin 34 is a round cylinder and moves up to the edge of the drive pin engaging hole 54 in the disk hub 52, the amount of time the drive pin 34 needs to become inserted after finding the drive pin engaging hole 54 is longer.

In the embodiment shown in FIG. 5 (a), the front half of the drive pin 34 is rounded, but the back end of the drive pin 34 is cut off to form a cut out section 36. When the drive pin 34 makes a sliding contact with the edge of the drive pin engaging hole 54, the drive pin 34 is inserted into the drive pin engaging hole 54 when the back end of the drive pin engaging hole 54 reaches the cut out section 36, and the disk hub 52 is mounted on the disk hub mounting section 26. The single dot-dashed line 54A in FIG. 5 indicates the relative position of the drive pin engaging hole 54 with respect to the drive pin 34 when the drive pin 34 reaches the drive pin engaging hole 54. The double dot-dashed line in FIG. 5 indicates the interim position of the drive pin engaging hole 54, and the solid line in FIG. 5 indicates the position of the drive pin engaging hole 54 when the drive pin 34 has been inserted.

As mentioned above, the example shown here has a cutout 36 in the back end of the drive pin 34 for quicker insertion of the drive pin 34 into the drive pin engaging hole 54. A chamfered section 39 is also formed so that the amount of time from the discovery of the drive pin engaging hole 54 by the drive pin 34 to the engagement of the drive pin engaging hole 54 by the drive pin 34 can be reduced, and the engagement occurs better and more quickly. The effect is to improve conventional disk-rotating drive mechanisms and reduce disk chucking errors by the thinner disk-rotating drive mechanisms.

As mentioned above, the drive pin 34 in the preferred embodiment is made of metal, such as stainless steel, more specifically, sintered and magnetized ferrite stainless steel. By using sintered stainless steel for the drive pin 34, the desired shape can be more easily obtained. The sintered drive pin 34 in the present invention does not contain lubricating oil. Therefore, lubricating oil does not adhere to the disk hub 52 or the disk.

The rotating unit 22 has a chucking magnet 42 to attract the disk hub 52 toward the outside of the drive pin 34 and position the disk hub 52 on the disk hub mounting section 26. FIG. 6 shows an example of the chucking magnet 42. The periphery of the chucking magnet 42 has alternating north and south poles. By reducing the radial distance between the chucking magnet 42 and the drive pin 34 so that it is smaller than the peripheral distance between the drive pin 34 and the chucking magnet 42, a magnetic attractive force can be generated between the chucking magnet 42 and the ferrite stainless steel drive pin 34, and the chucking lever 30 can be rotated counterclockwise within the range allowed by the window hole 29 in the rotor case 28 shown in FIG. 6, so that the drive pin 34 is forced toward the outside of radial direction of the rotating unit 22. In FIG. 6, therefore, the chucking magnets 42 to the outside of the drive pin 34 are closer to the drive pin 34 than the chucking magnets 42 positioned to the right of the drive pin 34. After the drive pin 34 has been inserted into the drive pin engaging hole 54, the edge of the drive pin engaging hole 54 is pushed radially to the outside of the rotating unit 22, and the disk is centered.

Because the drive pin in the present invention is made of metal, damage and wear to the drive pin, caused by impact when the drive pin engages the drive pin engaging hole, can be prevented. Because the upper surface of the drive pin is an inclined surface that is higher on the outside than on the inside as viewed from the rotating shaft, and a chamfered section is formed in the outer edge of the inclined surface, the disk hub and drive pin come close to each other without making contact when the drive pin has not been inserted into the drive pin engaging hole due to the shallow angle of the outer edge of the inclined surface - even though the drive pin is made of metal. The result is a superior drive hub and drive pin for disk-rotating drive mechanisms capable of high speeds in which the damage caused to the disk hub by contact with the drive pin can be reduced.

It will be apparent to those skilled in the art that various modifications and variations can be made to the disk rotating drive mechanism of the present invention without departing from the spirit or scope of the inventions. Thus, it is intended that the present invention cover modifications and variations of this invention that come within its the scope of the appended claims and their equivalents.

What is claimed is:

1. A disk rotating drive mechanism for rotating a floppy disk having a disk hub with a center hole and a drive pin engaging hole positioned eccentrically from the center hole, the disk rotating drive mechanism comprising:

a rotating shaft for engaging the center hole in the disk hub;

a rotating unit that rotates with the rotating shaft;

a chucking lever pivotally supported by the rotating unit at one end; and a drive pin made of metal and provided on another end of the chucking lever engaging the drive pin engaging hole in the disk hub to rotate the disk the drive pin defining an upper surface that is inclined to be higher at an outside portion that is farther from the rotation shaft than at an inside portion that is nearer the rotating shaft, the drive pin further defining a chamfered section formed at the outside edge of the inclined upper surface, wherein the drive pin defines a front surface corresponding to a portion of the drive pin that is leading in a rotation direction of the rotating unit, and a back surface corresponding to a portion of the drive pin that is trailing in the rotation direction of the rotating unit, wherein the front surface is curved and the back surface is flat.

2. The disk rotating drive mechanism of claim 1, wherein the front surface is about one half of a cylindrical surface.

3. The disk rotating drive mechanism of claim 1, wherein the front surface is about two third of a cylindrical surface.

4. The disk rotating drive mechanism of claim 1, wherein the front surface is about four fifth of a cylindrical surface.

5. The disk rotating drive mechanism of claim 1, wherein the chamfered section of the drive pin forms an angel of about 3° to 15° with respect to the inclined upper surface of the drive pin.

6. The disk rotating drive mechanism of claim 1, wherein the rotating unit includes a disk hub mounting section for mounting the disk hub, the disk hub mounting section being disposed closer to the rotating shaft than the drive pin is, the drive pin and the disk hub mounting section cooperate to define an angle of inclination of the disk hub when the disk hub is placed on the disk hub mounting section and the drive pin when the drive pin is not engaged with the drive pin engaging the hole on the disk hub, wherein an angle of inclination of the upper surface on the drive pin is greater than or equal to the angle of inclination of the disk hub.

7. The disk rotating drive mechanism of claim 1, wherein the drive pin is made of magnetized stainless steel.

8. The disk rotating drive mechanism of claim 7, wherein the chamfered section of the drive pin forms an angle of about 3° to 15° with respect to the inclined upper surface of the drive pin.

9. The disk rotating drive mechanism of claim 7, wherein the rotating unit includes a disk hub mounting section and a chucking magnet for exerting a magnetic attractive force on the disk hub to mount the disk hub on the disk hub mounting section, and for exerting a magnetic attractive force on the drive pin to urge the drive pin in a direction away from the rotating shaft.

10. The disk rotating drive mechanism of claim 7, wherein the drive pin is made of sintered stainless steel.

11. The disk rotating drive mechanism of claim 7, wherein the drive pin is made of sintered stainless steel without containing a lubricating oil.

12. The disk rotating drive mechanism of claim 7, wherein the rotating unit includes a disk hub mounting section for mounting the disk hub, the disk hub mounting section being disposed closer to the rotating shaft than the drive pin is, the drive pin and the disk hub mounting section cooperate to define an angle of inclination of the disk hub when the disk hub is placed on the disk hub mounting section and the drive pin when the drive pin is not engaged with the drive pin engaging hole on the disk hub, wherein an angle of inclination of the upper surface on the drive pin is greater than or equal to the angle of inclination of the disk hub.

* * * * *